(12) United States Patent
Wright et al.

(10) Patent No.: US 10,779,137 B2
(45) Date of Patent: Sep. 15, 2020

(54) PASSENGER VEHICLE INTERFACE SYSTEM

(71) Applicant: IFPL Group Limited, Isle of Wight (GB)

(72) Inventors: John Wright, Isle of Wight (GB); Geoff Underwood, Isle of Wight (GB); David Thomas, Isle of Wight (GB); Sam Blakeley, Isle of Wight (GB)

(73) Assignee: IFPL Group Limited, Isle of Wight (GB)

(*) Notice: Subject to any disclaimer, the term of this patent is extended or adjusted under 35 U.S.C. 154(b) by 0 days.

(21) Appl. No.: 16/049,985

(22) Filed: Jul. 31, 2018

(65) Prior Publication Data

US 2019/0141497 A1 May 9, 2019

(30) Foreign Application Priority Data

Jul. 31, 2017 (GB) .................. 1712310.0

(51) Int. Cl.
| | |
|---|---|
| *H04W 4/42* | (2018.01) |
| *B64D 11/00* | (2006.01) |
| *G06F 1/16* | (2006.01) |
| *H04W 76/14* | (2018.01) |
| *G06Q 20/32* | (2012.01) |
| *B60N 2/90* | (2018.01) |
| *B60R 11/02* | (2006.01) |
| *B60R 11/00* | (2006.01) |
| *H04W 84/12* | (2009.01) |

(52) U.S. Cl.
CPC .......... *H04W 4/42* (2018.02); *B64D 11/0015* (2013.01); *B64D 11/00151* (2014.12); *G06F 1/1632* (2013.01); *G06Q 20/3278* (2013.01); *H04W 76/14* (2018.02); *B60N 2/90* (2018.02); *B60R 11/0229* (2013.01); *B60R 2011/0005* (2013.01); *B60R 2011/0015* (2013.01); *B60R 2011/0288* (2013.01); *H04W 84/12* (2013.01)

(58) Field of Classification Search
CPC .................................................... G06F 1/1632
See application file for complete search history.

(56) References Cited

U.S. PATENT DOCUMENTS

| | | | | |
|---|---|---|---|---|
| 2006/0282597 | A1* | 12/2006 | Plogmann | G01C 23/005 710/303 |
| 2010/0037072 | A1* | 2/2010 | Nejah | G06F 1/1632 713/310 |
| 2011/0134333 | A1* | 6/2011 | Petrisor | B64D 11/0015 348/730 |

(Continued)

OTHER PUBLICATIONS

Communication pursuant to Article 94(3) EPC issued in co-pending application No. 18275109.9 dated Jul. 9, 2020.

*Primary Examiner* — Christle I Marshall
(74) *Attorney, Agent, or Firm* — Whiteford, Taylor & Preston, LLP; Peter J. Davis

(57) ABSTRACT

A passenger interface apparatus for a passenger transportation vehicle having a visual display generator, a docking station, a removable processor unit detachably connected to the docking station, a connection between the docking station and the visual display generator for the supply of data and/or signalling to the visual display generator, the removable processor unit having a memory, a data processor, and a connection interface to connect to the docking station.

14 Claims, 3 Drawing Sheets

(56) References Cited

U.S. PATENT DOCUMENTS

2012/0039048 A1    2/2012  Mondragon et al.
2013/0015687 A1    1/2013  Kraemer
2013/0251351 A1*  9/2013  Schedivy ................ B60N 2/64
                                                                  386/362

\* cited by examiner

PASSENGER VEHICLE INTERFACE SYSTEM

TECHNICAL FIELD

The present invention relates generally to passenger vehicle interfaces, which generally comprise a passenger audio-visual system, and in particular, although not exclusively, relates to aircraft inflight entertainment systems.

BACKGROUND

Commercial aircraft, such as those that are routinely to be used on flights over four hours duration tend to provide passengers with entertainment systems delivering audio and video content. This is referred to as In Flight Entertainment (IFE); a typical system comprising an onboard host subsystem capable of delivering audio and visual content and seat-based display systems. These are typically connected together via hard wired connections or increasingly via wireless delivery.

The monitors tend to be intelligent devices in that they provide direct passenger interactivity via on-screen menus activated via a seat based passenger control unit (PCU) or directly into the screen via touch enabled membranes or similar screen based technology.

Increasingly, the seat-based monitors also act as a hub for other devices either connected within the seat environment i.e. headphone jacks, USB interfaces and power connectors. The latter two devices enable passengers to power their own 'carry-on' devices or communicate with the seat back monitor to interact their own devices with the seat based monitor.

The cost and weight associated to the seat-based monitors usually result in the devices being installed for a number of years unless they fail in-service. In addition, different classes of passenger groups such as economy, premium economy, business and first class tend to use different grades of device to match the seat class. These impose other issues in relation to maintenance and upgrades in that the service provider has to be equipped with sufficient resources to repair multiple and distinct models of equipment during maintenance/servicing.

This can result in a system that is cumbersome to maintain and expensive to update at the pace of consumer based technology.

We seek to provide an improved solution.

SUMMARY

According to the first aspect of the invention there is provided a passenger interface system for a passenger transportation vehicle comprising:
a visual display generator
a docking station
a removable processor unit, arranged to be detachably connected to the docking station,
a connection provided between the docking station and the visual display generator, arranged to supply data and/or signalling to the visual display generator,
the removable processor unit comprising a memory, a data processor, and a connection interface arranged to connect to a connection interface of the docking station such that when in a connected condition the connection interfaces arranged to convey data and/or signalling therebetween.

The docking station may be arranged to provide power to the visual display generator.

Data may comprise audio content to be heard through headphones, and/or visual content to be displayed on the display screen.

Signalling may comprise a control instruction.

At least one of the docking station and the removable processor may comprise transceiver for emitting and receiving signals over an air interface, such as may be termed a wireless connection, which may then be part of a local area network.

The removable processor unit may comprise electronic circuitry.

The connection interface of the removable processor unit may comprise multiple electrical contacts. The electrical contacts may be arranged to come into engagement with counterpart electrical contacts of the docking station. The electrical contacts may comprise an array of side-by-side electrical contact portions.

The removable processor unit may have an (external) shape and configuration such that an orientation relative to the docking station is required in order to achieve a successful connection between the connection interface of the processor unit and the connection interface of the docking station. A formation or external surface of the removable processor unit may comprise a relief feature which is arranged to be complementary with a feature of the docking station, in order to ensure a correct orientation (and substantially prevent a user from connection the processor to the docking station in an incorrect orientation). Said features may be termed alignment or orientation features. Part or a portion of the removable processor unit may have a footprint or transverse cross-sectional shape which is rotationally asymmetric.

The connection interface of the removable processor unit may comprise a plug formation, which is arranged to be received by a (socket formation) of the docking station.

The removable processor unit may comprise a casing or housing which is arranged to limit or prevent ingress of moisture, and may be ruggedized to minimise the risk of damage to internal circuitry during handling and use of the unit, and generally to protect against 'wear and tear', thus enhancing operational longevity of the processor unit.

The memory of the processor unit may comprise machine-readable and executable instructions (such as an application or driver) arranged to effect a control or a required functionality of the passenger interface. The instructions may be provided by software or firmware.

The removable processor unit may comprise a RAM, a persistent memory, a CPU (Central Processing Unit) and/or a GPU (Graphics Processing Unit).

The functionality which may be provided by the removable processor unit may include any of the following:
regulation of power output and supplied to a connected passenger device (such as computer, telephone or tablet device), such as for charging a battery of such a device;
processing of passenger payments from a payment credential (such as a credit or debit or bank card) input by a passenger to pay for goods/services offered. In this regard, instructions stored in the processor may be such as to cause generation of an on-screen graphic interface which is arranged to allow passengers to conveniently select and pay for goods and services offered (details of which are displayed on the screen);
processing of incoming audio and or visual signals, to a respective output port of the docking station (such as visual content directed to the visual display screen, and audio content directed to an audio output port, such as a headphone jack or socket). For visual content signals, this may include image or moving image rendering (for example implemented by way of the GPU);

processing of signals received from a passenger control unit (PCU) input, for example to change an audio/visual channel; to play, pause, stop, fast forward or rewind audio/visual content; to adjust the visual display screen settings (such as brightness, volume, ON/OFF); to call for staff assistance; to make a selection from a number of displayed options on the visual display screen; ON/OFF control of reading light;

where the visual display screen is a touch screen, the processor unit may be configured to receive signals from input touch gestures, and output a suitable control signal.

More generally, stored instructions for managing and controlling operation and functionalities of the passenger interface, which may include an operating system, such as an Android®, LUMIX® or Windows® operating system. The stored instructions may be referred to as comprising one or more drivers for connected peripheral devices or units, which include suitable (machine-readable and executable) instructions.

Instructions stored in the processor may be configured to receive a remotely generated signal which when processed by the processor unit, causes the processor unit to be disconnected (either physically or operatively) from the docking station, or to cease operation whilst in situ in the docking station. The signal may be generated from a remotely located controller node or terminal, by a system administrator, such as maintenance personnel.

The removable processor unit may be viewed as providing/determining control signals to effect control of some or substantially all functionalities of the passenger interface, or a connected peripheral or device.

The docking station may comprise an input for receiving a power supply. The power supply may be provided from an aircraft's power supply.

The docking station may comprise an input arranged to be connected to a source of audio/visual material, or media content.

The docking station may be arranged to connect to a payment credential reader, such as a capacitive bank or credit card reader, which may include a near field communication (NFC) reader.

The docking station and the visual display unit may comprise two respective separate/discernible units or parts, or the docking station may be integral with the visual display unit.

The docking station may provide a mount for the removable processor unit.

The docking station may comprise a port, bounded by a wall which is arranged to receive the removable processor unit. The docking station may comprise a socket or female connector, to detachably receiving the removable processor unit.

The docking station may be arranged to retain the removable processor unit in a connected condition. This may be by way of engagement between the processor unit and the docking station. This may be by way of frictional or mechanical engagement between the removable processor unit and the docking station. This may be by way of a latch or retaining feature or detent, which may be arranged to be actuated to a release condition or a retain condition.

The docking station, in one realisation, may provide a powered latch that 'ejects' the processor unit when requested by way of a received signal from a maintenance or controller system.

The system in the context of an aircraft's IFE may provide a notification system to alert the (ground) crew or staff of the location of the passenger interface to be serviced, maintained or replaced, by the use of an emitter. Detection of such an alert could result in automatically 'ejecting' the processor unit from its mounting to the docking station.

The docking station may be considered as a connectivity hub. The docking station may be viewed as providing connectivity for a passenger interface to a passenger vehicle's power and data systems, and to connected devices, units, sub-systems, peripherals, and output ports.

The visual display may comprise a screen, such as an LCD, LED, OLED, thin film and flexible screen types. The visual display may be a touch sensitive device. The visual display may comprise a projector unit, arranged to project images into a screen or surface. The visual display may comprise a DLP (Digital Light Processing) projector.

The visual display unit may be arranged to be substantially devoid of data processing capability. The visual display unit may be termed a slave unit or a dumb unit/terminal. This may be viewed as an output device that accepts and displays incoming data through an input. By way of contrast, a smart terminal is a monitor that has its own processor, which provides enhanced functionality. Therefore in the context of the present invention, this may be viewed as providing screen-agnostic processing or intelligence capability.

According to a second aspect of the invention there is provided a passenger seat or a bulkhead of a multi-passenger transportation vehicle, which comprises the system of the first aspect of the invention.

The seat or bulkhead may be provided with an (internal) space/void to receive and contain the removable processor unit.

The seat or bulkhead may be arranged to provide for access to the space such as to allow manual removal and installation of the removable processor.

There may be provided a displaceable cover or door, which is arranged to be moved from a closed to an open condition so as to allow (external) access to said space. In a closed condition, the cover is arranged to close-off the space.

It will be appreciated that an alternative way would be to install the docking station within an overhead structure (such as adjacent or part of a baggage storage compartment or support). However, it may be preferable to locate the docking station in close proximity to the display screen, so as to minimise the extent of any wiring or cable run.

According to a third aspect of the invention there is provided a docking station and a removable processor unit of the first aspect of the invention.

The invention may comprise one or more features described in the description and/or as shown in the drawings, either individually or in combination.

BRIEF DESCRIPTION OF THE DRAWINGS

Various embodiments of the invention will now be described, by way of example only, with reference to the accompanying drawings in which:

FIG. 3 is a schematic of a removable processor unit and docking station of the interface of FIG. 2, with an access cover in a closed condition, FIG. 4 shows the arrangement of FIG. 3 but with the access cover in an open condition.

DETAILED DESCRIPTION

There will now be described a vehicle passenger interface system, described in the context an inflight entertainment (IFE) system onboard a commercial passenger aircraft. As will be described below, the system described advantageously significantly facilitates system upgrades and maintenance procedures, such as for installing any upgrades to the operating system, or to any of the drivers, or in replacing a faulty unit.

Figure 1:
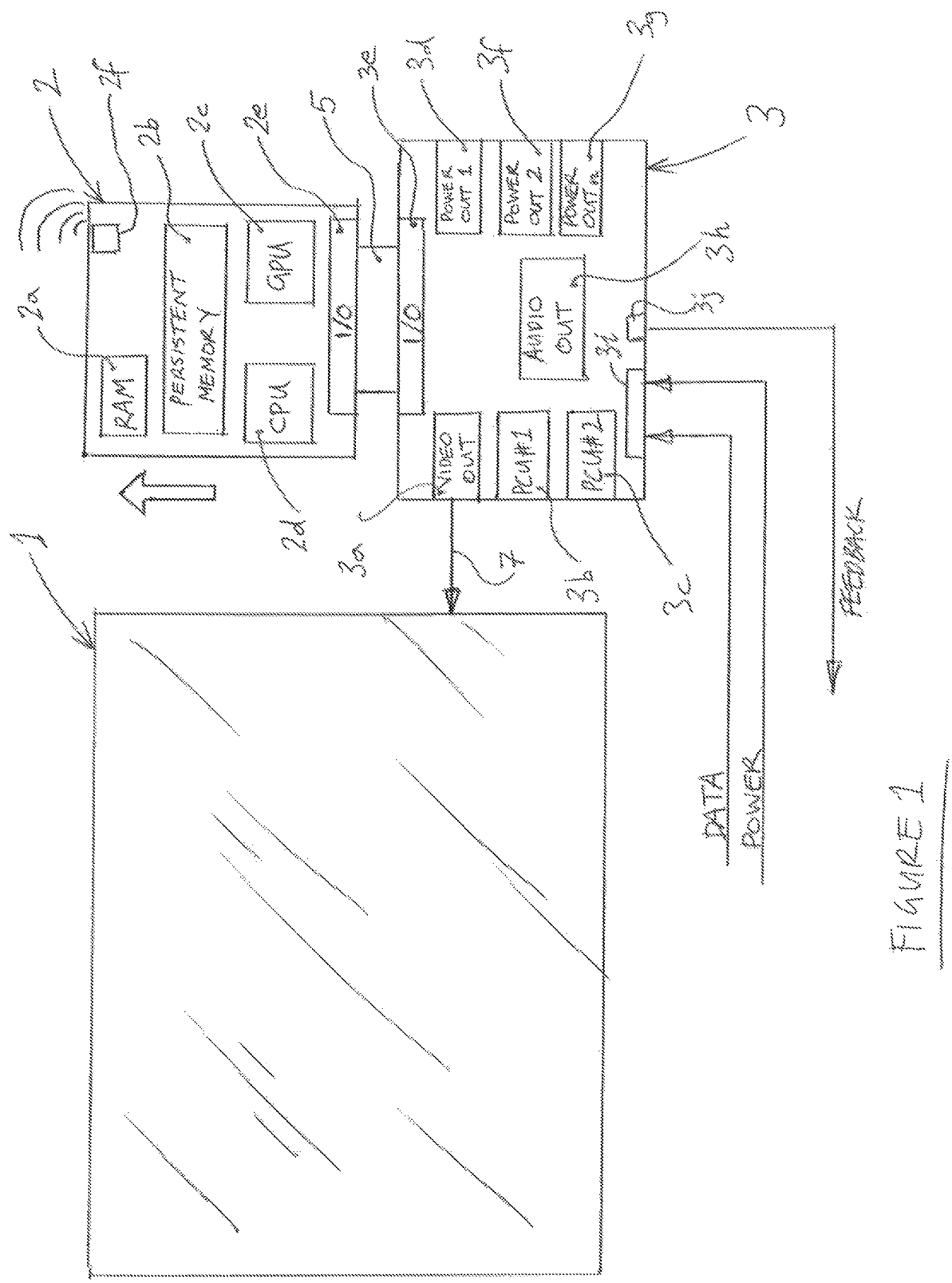
FIG. 1 is a block diagram of a passenger vehicle interface system.

Reference is made to FIG. 1 which shows a block diagram of a passenger interface system which comprises a display screen 1, a removable processor unit 2 and a docking station 3. The removable processor unit 2 is arranged to be detachably connected to the docking station 3.

The removable processor 2 comprises a RAM and persistent memories 2a and 2b respectively. The processor unit 2 further comprises a central processing unit (CPU) 2d, and a graphical processing unit (GPU)

The persistent memory 2b is loaded with an operating system, interface applications and various drivers. The operating system may include 'home' or 'welcome' screens displayed on the screen 1, as well as a gateway to the various functionalities offered by the passenger interface. The drivers enable various specific passenger selected functionalities to be effected, in response to an input from a passenger. The interface applications, more commonly known as Application Programming Interface (API), may include specific software routines to provide third party extensions and interfaces to extend the range of products, both hardware and software, supported.

The processor unit 2 stores various modules, such as:
Operating System (such as, but not exclusively, Android®)
Video and audio generation from received content (and in particular by the GPU 2c), and passenger control thereof
On-screen games
Moving map
Access to a data bus, such as an ARINC 429 data bus
Passenger payment processing
Passenger control unit (PCU) (for example reading light and attendant call, and passenger control of output audio/visual content, such as onscreen brightness and volume control)

The processor unit also stores instructions to manage and control various aspects of external connectivity, such as:
USB power and data
Audio jack
WiFi®
Bluetooth®
Video output (such as 1080 video output HDMI)
Auxiliary inputs for additional peripherals such as NFC Contactless card reader The docking station 3 comprises a connection interface 3e. The connection interface 3e is arranged to be brought into connection with the connection interface 2e of the removable processor unit. Each connection interface comprises an array of side-by-side electrical contacts (not illustrated) which when in a connected condition are brought into physical contact with each other. When in the connected condition data and signalling can be exchanged between the processor unit 2 and the docking station 3. This could be in analogue format or in digital format.

The docking station 3 further comprises a number of ports for connection to various peripheral and remote devices. The docking station 3 includes a number n power out ports, labelled 3d, 3f and 3g. These are connected to USB type connectors provided for use by a passenger to charge his/her (carry-on) device, such as a laptop, mobile telephone or tablet device. More than one different power outlet type may be provided, such as different USB types. Each different type is connected to a respective port The docking station 3 further includes an audio out port 3h. This is connected to a headphone socket or jack (not shown) by which a passenger can connect headphones to and listen to audio content.

The docking station 3 further includes a port 3i, for connection to the aircraft's data and power systems. Through this power is received the visual/audio content from the aircrafts server, which stores such content, available on-demand for passengers. The power received through this port 3i is sourced (ultimately) from the aircraft's engine (s), and is used for powering the display screen 1, and for use in charging any connected passenger devices. In a different embodiment, or provided as a option to the user, the data may be conveyed between the data processor and the aircraft's data system (such as the media content of audio/visual material) over a wireless connection, as opposed to a wired connection). In FIG. 1, the processor unit 2 is shown with a wireless transceiver 2f, which creates a LAN with the aircraft's server. It will be appreciated, however, that the interface 3i would nevertheless be required in any event for receipt of power.

The display screen 1 is (typically) installed in a rearward part of a forward passenger seat. The screen 1 may be of touch screen type (either by way of capacitive or resistive type) to receive a passenger's input through touch gestures applied to the screen. A driver provided in the persistent memory of the processor unit 2, or as firmware) is configured to process such inputs, and bring about a required response.

The docking station 3 also comprises a video out port, 3a. This is arranged to be connected to the display screen 1 by way of a wired connection 7. Visual media content which has been processed by the processor unit 2 (in particular the GPU of the processor unit) is then conveyed to the port 3a as an input to the display screen 1.

The docking station 3 further comprises at least two PCU ports 3b and 3c. The first PCU port 3b may provide basic PCU functionality, such as attendant call and reading light control. The second PCU port 3c may provide higher level functionality, such as touch screen inputs and allow for inputs received from a multi-button PCU handset.

The docking station also comprises a feedback port 3j. This may provide status information to the aircraft server, or an administrator terminal. Status information relating to a particular passenger seat could be output on demand and/or automatically.

Figure 2:
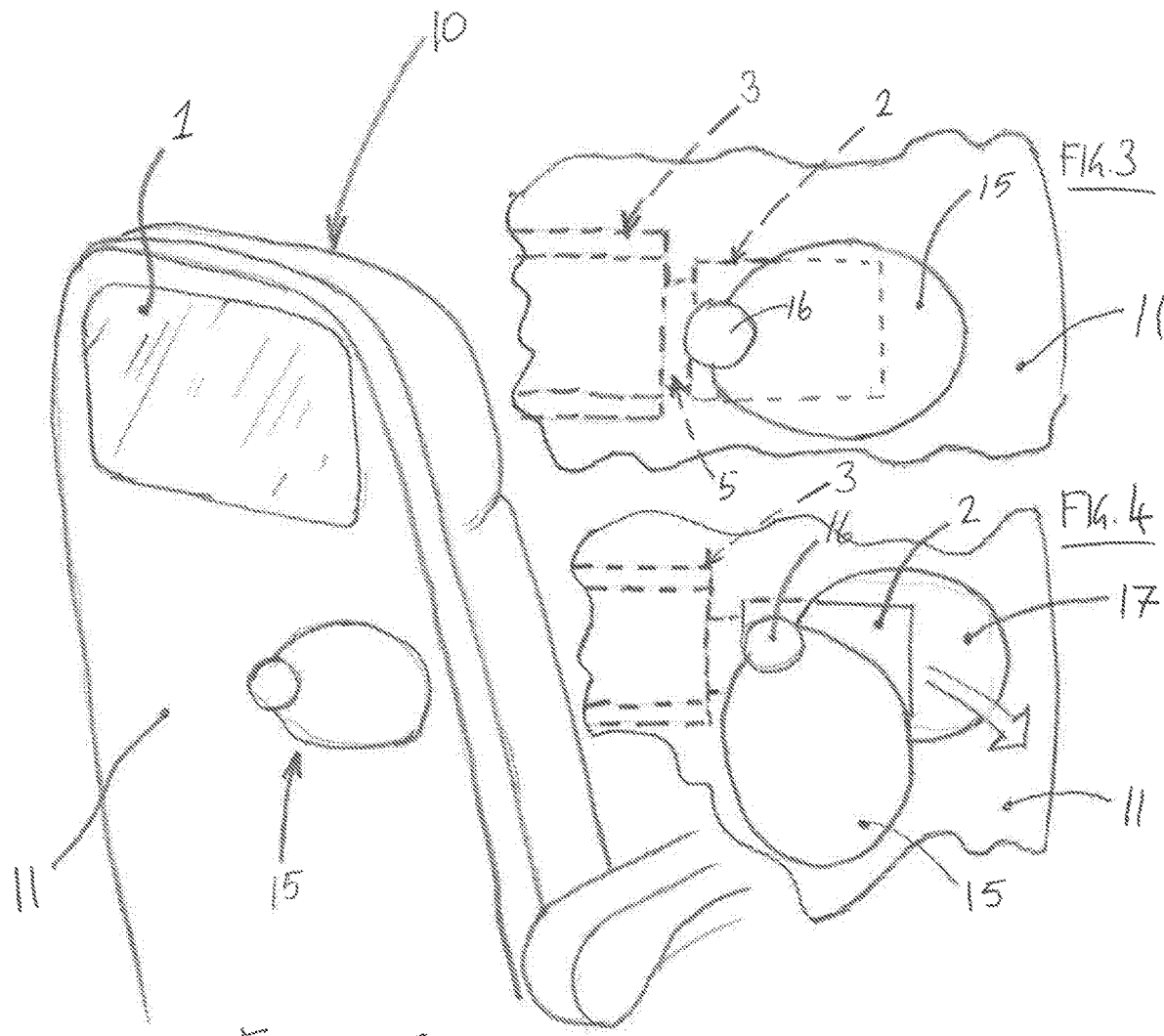
FIG. 2 is a schematic showing a passenger interface incorporated into a seat.

Reference is made to FIG. 2, which shows an example of the how the passenger interface system could be installed in an aircraft. As can be seen, the display screen 1 is embedded within a passenger seat 10. The processor unit and the docking station are also provided within (a rearward portion) of the seat 10, albeit with the docking station fixedly installed, and the processor unit detachable connected to the docking station 3. The processor unit 2 and the docking station 3 are provided within a recess or space within the spatial envelope of the seat. This space is provided with an opening, which is selectively closable by way of the displaceable cover 15. In this embodiment, the cover 15 is pivotably mounted, and arranged to be moved from a closed condition, in which the removable processor unit is inaccessible, to an open condition in which the processor unit 2 is accessible.

The cover 15 is mounted to a pivot 16, and thereby can be rotated from a closed position to an open position and vice versa. In the closed condition, the cover 15 covers the space 17, which contains the removable processor unit 2. The space 17 is located in a rearward side 11 of the seat 10.

In the event that the processor unit 2 needs to be removed, authorised personal can simply manually grip the body of the unit 2, and pull the unit away from engagement with the docking station. The processor unit 2 may be held in position to the docking station 3 by way of frictional engagement. Alternatively, this may be enhanced or replaced by a retaining feature or mechanism. Where this is a powered/active actuatable arrangement, a received control signal may release a latch or lock to allow the processor unit 2 be removed. Alternatively, the mechanism may physically disconnect the processor unit from the docking station, and urge the unit to become physically separated therefrom. The control signal may be received from a control terminal (such as that controlled by an administrator or maintenance operative, authorised to do so). The control terminal may be in communication with the aircraft's server.

The access cover 15 may be retained in a closed condition by way of a lock, fastener or latch, which is intended only to be unlocked by authorised persons, such as maintenance personnel. The lock may be a powered assembly which is arranged to be activated and deactivated by way of a NFC 'key'. FIG. 3 shows the access cover 15 in a closed condition, and FIG. 4 shows the access cover in a closed condition.

The external configuration of the body of the processor unit 2 is such that a required orientation of the processor unit relative to the docking station is required in order to connect the two components together. This may be by way of example, that the external body of the processor unit is provided with an alignment formation, for which a counterpart formation is provided by the docking station 3. This required alignment, to achieve electrical connection between two components, ensures that the electrical contacts of each of the processor unit and the docking station are correctly matched to ensure an operative connection, as well as avoid any potential damage resulting from the electrical contacts being incorrectly connected. Therefore, a replacement processor unit needs first to be correctly aligned and orientated, and then manually pushed/urged into position and engagement with the docking station. Part of the transverse cross-sectional shape of the unit, for example that part which is received by the docking station, may be rotationally asymmetric with a corresponding/counterpart shape/formation provided by the connection interface of the docking station to as to ensure correct alignment.

For those (foremost) passenger seats which face a bulkhead within an aircraft cabin, then the docking station and removable processor unit may be provided within a void of the bulkhead.

Figure 5:
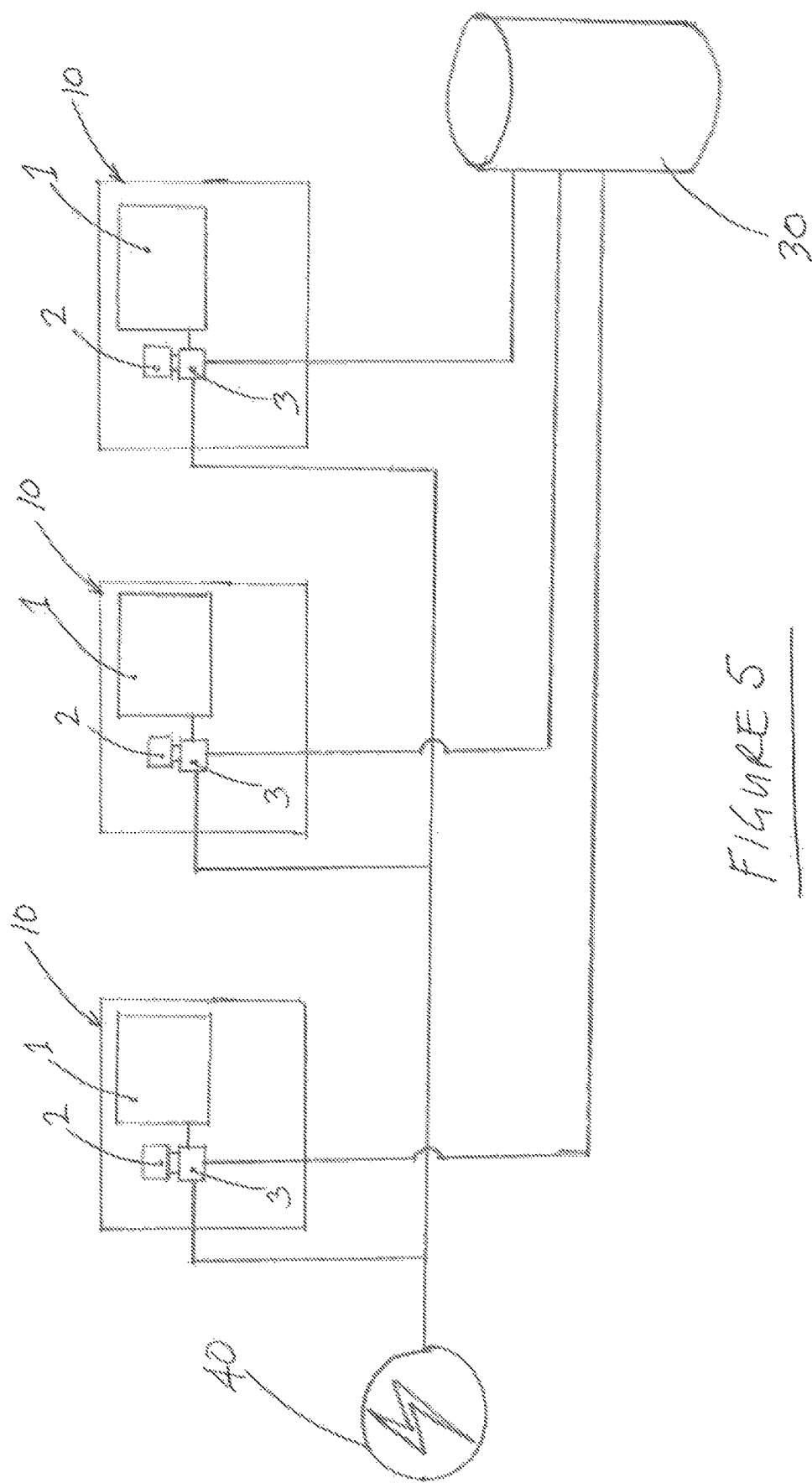
FIG. 5 is a schematic diagram showing multiple passenger interfaces, connected to data content and to a power supply.

Reference is made to FIG. 5 which shows a simplified view of multiple passenger interfaces, connected to an aircraft power supply 40 and to an aircraft's server or communication's host 30. The host 30 may comprise a server, which may store the IFE's media content, such as films, music etc, which is available on-demand to passengers. The host 30 also provides a communication channel to each passenger interface, for status updates/requests, as well as for issuing control signals (such as to 'eject' or disconnect a particular removable data processor unit), for maintenance/servicing procedures.

The embodiments described above advantageously enable an airline or servicing company to upgrade an installed IFE system both rapidly and conveniently.

The passenger interfaces arrangements described above also allows future developments to be straightforwardly incorporated without requiring modification of the seat structure, thereby eliminating the need to re-qualify the system and the seat assembly before use (in accordance with regulatory requirements).

The docking station can advantageously be customised to suit different seat geometries, and volumetric and dimensional characteristics and constraints.

Yet further benefits are reduced costs resulting from reduced weight, reduced maintenance downtime, and reduced upgrade costs.

Reduced weight gives rise to reduced airline running costs due to fuel efficiencies gained by weight savings.

Passenger interfaces can be reconfigured for upgrade rapidly—enabling airlines to react to consumer trends and innovations quickly and cost effectively Specific application has been described above in relation to aircraft; however, the invention is equally applicable to other mass-transportation types, which include passenger interfaces, which requiring processing/intelligent functionality.

The invention claimed is:

1. A passenger interface apparatus for a passenger transportation vehicle comprising:
   a visual display generator;
   a docking station;
   a removable processor unit, configured to be detachably connected to the docking station,
   a connection provided between the docking station and the visual display generator, configured to supply data and/or signalling to the visual display generator,
   the removable processor unit comprising a memory, a data processor, and a connection interface configured to connect to a connection interface of the docking station such that when in a connected condition the connection interfaces configured to convey data and/or signalling therebetween, and the docking station arranged to retain the removable processor unit in a connected condition by way of at least one of a latch, a retaining feature or a detent, which is arranged to be actuated to a release condition or a retain condition.

2. The apparatus of claim 1 in which the connection interface of the removable processor unit comprises multiple electrical contacts, and the electrical contacts are configured to come into engagement with counterpart electrical contacts of the docking station.

3. The apparatus as claimed in claim 1 in which the removable processor unit has an external shape and configuration such that an orientation relative to the docking station is required in order to achieve a successful connection between the connection interface of the processor unit and the connection interface of the docking station.

4. The apparatus as claimed in claim 1 in which the memory of the processor unit is configured to store machine-readable and executable instructions to in use effect a control or a required functionality of the passenger interface apparatus.

5. The apparatus as claimed in claim 4 in which the memory of the processor unit is configured to store instructions for managing and controlling operation and functionalities of the passenger interface apparatus, which may include an operating system, and one or more drivers for connected peripheral devices or units.

6. The apparatus as claimed in claim 1 in which the removable processor unit comprises a RAM, a persistent memory, a CPU (Central Processing Unit) and/or a GPU (Graphics Processing Unit).

7. The apparatus as claimed in claim 1 in which the docking station comprises an input port for receiving a power supply, and the processor is configured to selectively regulate the power to a power outlet.

8. The apparatus as claimed in claim 1 in which the docking station comprises an input port configured to be connected to a source of audio/visual data, and a first output port configured to output visual content to the visual display generator, and a second output port configured to output audio material to an audio connector.

9. The apparatus as claimed in claim 8 in which the processor unit is configured to perform any necessary processing of received audio/visual data, before sent to the first and/or second output ports.

10. The apparatus as claimed in claim 1 in which the docking station is configured to connect to and receive data from a payment credential reader, which reader includes a near field communication (NFC) reader.

11. The apparatus as claimed in claim 1 in which the removable processor unit is configured to be manually connectable to and manually detachable from the docking station.

12. A passenger seat or vehicle bulkhead of a multi-passenger transportation vehicle, which incorporates the apparatus of claim 1.

13. The passenger seat or vehicle bulkhead of claim 12 in which the seat or bulkhead is provided with an internal space/void to receive and contain the removable processor unit.

14. The apparatus as claimed in claim 1 in which the docking station comprises a powered latch that ejects the processor unit when requested by way of a received signal from a maintenance or controller system.

* * * * *